United States Patent [19]

Byrnes et al.

[11] Patent Number: 5,035,576
[45] Date of Patent: Jul. 30, 1991

[54] PROPELLER BLADE PIN ATTACHMENT

[75] Inventors: Francis E. Byrnes, White Plains, N.Y.; David N. Schmaling, Oxford, Conn.

[73] Assignee: United Technologies Corporation, Hartford, Conn.

[21] Appl. No.: 419,863

[22] Filed: Oct. 11, 1989

[51] Int. Cl.$^5$ .................. B64C 11/00; B64C 27/00
[52] U.S. Cl. .............................................. 416/134.00 R
[58] Field of Search ............... 416/134 R, 134 A, 140, 416/141, 174; 267/136, 162, 164; 384/221

[56] References Cited

U.S. PATENT DOCUMENTS

| | | | |
|---|---|---|---|
| 3,589,835 | 6/1971 | Linden | 416/141 |
| 3,764,230 | 10/1973 | Rybicki et al. | 416/134 A |
| 3,862,812 | 1/1975 | Gorndt et al. | 416/141 |
| 4,108,508 | 8/1978 | Clinard Jr. | 416/134 A |
| 4,257,739 | 3/1981 | Covington et al. | 416/134 A |
| 4,297,078 | 10/1981 | Martin | 416/139 A |
| 4,365,936 | 12/1982 | Hatch | 416/134 A |
| 4,877,375 | 10/1989 | Desjardins | 416/134 A |

Primary Examiner—Edward K. Look
Assistant Examiner—Hoang Nguyen
Attorney, Agent, or Firm—Lloyd D. Doigan; William W. Habelt; William W. Habelt

[57] ABSTRACT

A pitch retention member has a mounting surface which receives an elastomeric bearing disposed within a coupling attaching to the root end of the propeller blade. The mounting surface of the pitch retention member is conical. The coupling has a conically shaped bearing mounted therein which is bolted to the root end of the propeller blade. By bolding the coupling to the spar the conically shaped elastomeric bearing is precompressed against the conical mounting surface.

4 Claims, 3 Drawing Sheets

PROPELLER BLADE PIN ATTACHMENT

DESCRIPTION

1. Technical Field

This invention relates to an assembly for attaching a propeller blade to a hub.

2. Background Art

Typically, propeller blades are mounted to the hub of the propeller by means of a blade retention member. The member is rotatable within the hub to allow the pitch of the propeller mounted therein to be set as required. A spinner may enclose the hub and the member.

To replace a damaged blade, the spinner and/or the blade retention member and/or the hub may have to be disassembled. Because of the complexity of disassembly (and subsequent reassembly), blade changes are time consuming, expensive, and relatively complex. The problem is multiplied by propellers which utilize a plurality of blades.

In prop fans, each blade is rather heavily loaded absorbing as much as one thousand horsepower of engine torque and developing as much as fifteen hundred pounds of engine thrust. Heavily loaded propeller blades are subject to high vibratory loads and stresses. Moreover, because prop fan blades are swept, they are subject to instability at high speeds. It is known in the art to mount a propeller blade radially outwardly from a propeller spinner by means of a pin. By mounting the propeller radially outwardly of the spinner, blade replacement is simplified. Moreover, by mounting the propeller blade for rotation about the axis of the pin, blade response to modes of vibratory excitation therein is minimized thereby enhancing high speed stability of the propeller blade.

However, because the blade may rotate about the pin mount, high friction forces may be encountered between the pin and the blade, which may lead to excessive wear.

DISCLOSURE OF INVENTION

It is the object of the invention to provide a propeller assembly in which damaged blades are quickly and easily replaced.

It is a further object of the invention to provide an assembly which increases the tolerance of blades to foreign object damage.

It is the further object of the invention to provide an assembly which reduces blade vibratory retention loads and stresses.

It is the further object of the invention to provide an assembly which improves the high speed stability of the blade.

It is a further object of the invention to provide an assembly which minimizes the friction forces between the blade and the propeller mount.

According to the invention, a pitch retention member has a mounting surface which receives an elastomeric bearing disposed within a coupling attaching to the root end of the propeller blade.

According to a feature of the invention, the mounting surface of the pitch retention member is conical. The coupling has a conically shaped bearing mounted therein and is bolted to the root end of the spar. By bolting the coupling to the spar the conically shaped elastomeric bearing is precompressed against the conical mounting surface.

By mounting the propeller to the pitch change mechanism by means of a elastomeric bearing several advantages accrue: since elastomeric bearings accommodate motion by simple flexing of elastomeric laminates, there is no rolling or slipping between elements as in more conventional bearings; no lubrication or servicing of any kind is required; seal boots or dust covers are not needed; friction or wear is minimized; and, visional inspection is sufficient to determine bearing condition. The conical portions insure that the joint is stiff in a chordwise direction relative to the propeller blade.

The foregoing and other features and advantages of the present invention will become more apparent from the following description and accompanying drawings.

BEST MODE FOR CARRYING OUT THE INVENTION

Figure 1:
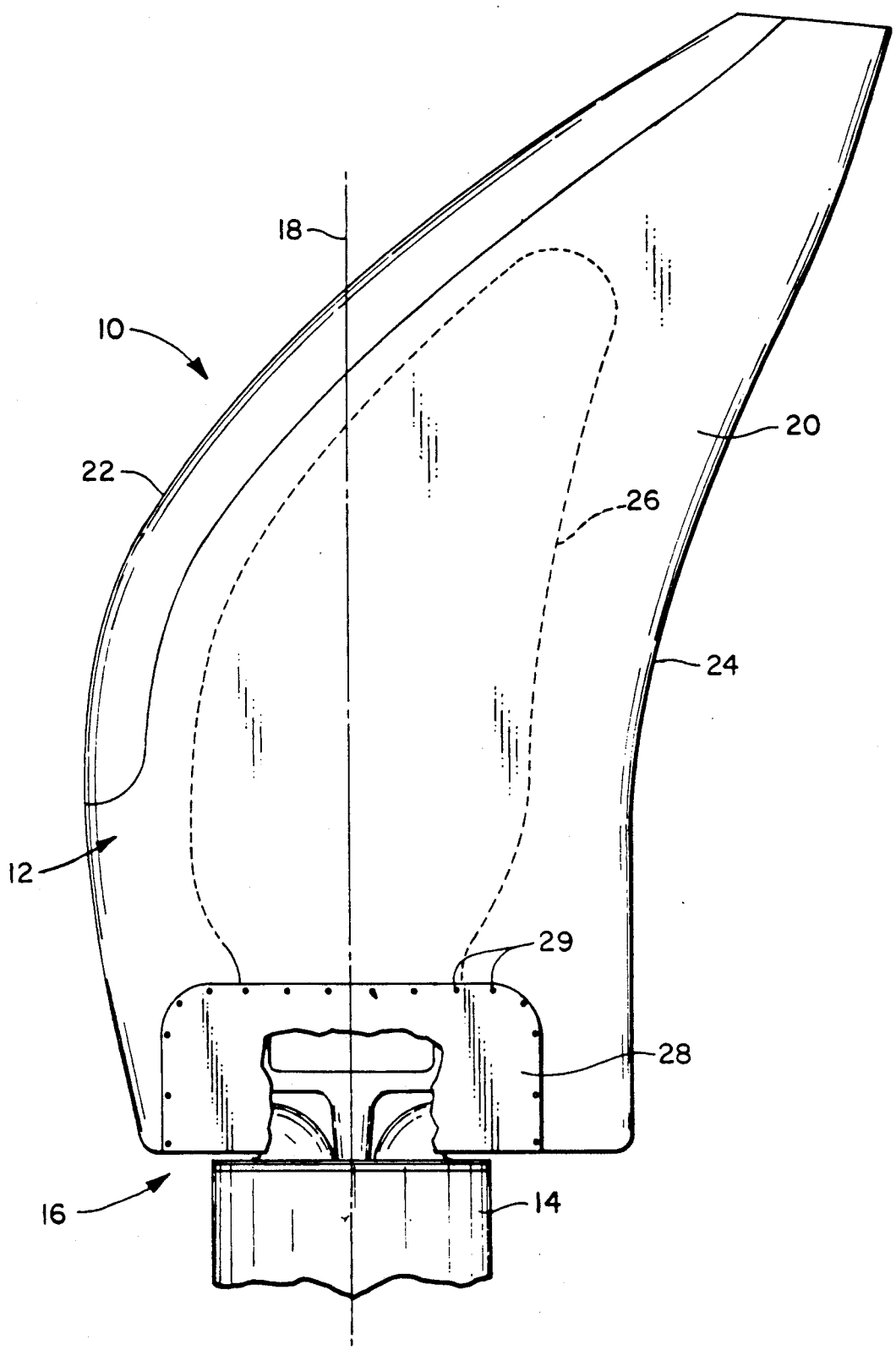
FIG. 1 shows perspective view of a prop fan propeller incorporating embodiment of the invention.

Referring to FIG. 1, a portion of a propeller 10 which provides the environment for an embodiment of the invention is shown. The propeller includes a simplified representation of a prop fan blade 12, a portion of a hub 14 housing a pitch retention member 15 (see FIGS. 2 and 3), and a mounting system (shown generally at 16). The blade maybe rotated angularly about its longitudinal axis 18 by the blade pitch retention member to set the pitch of the blade as is well known in the art.

The blade 12 consists of: an external skin 20 which provides an aerodynamic profile and forms a leading edge 22 and a trailing edge 24; a composite spar (shown as dotted line 26), which is the main load bearing member of the blade; and, an access panel 28. The access panel is attached flush to the external skin 20 by removeable means such as screws 29.

Figure 2:
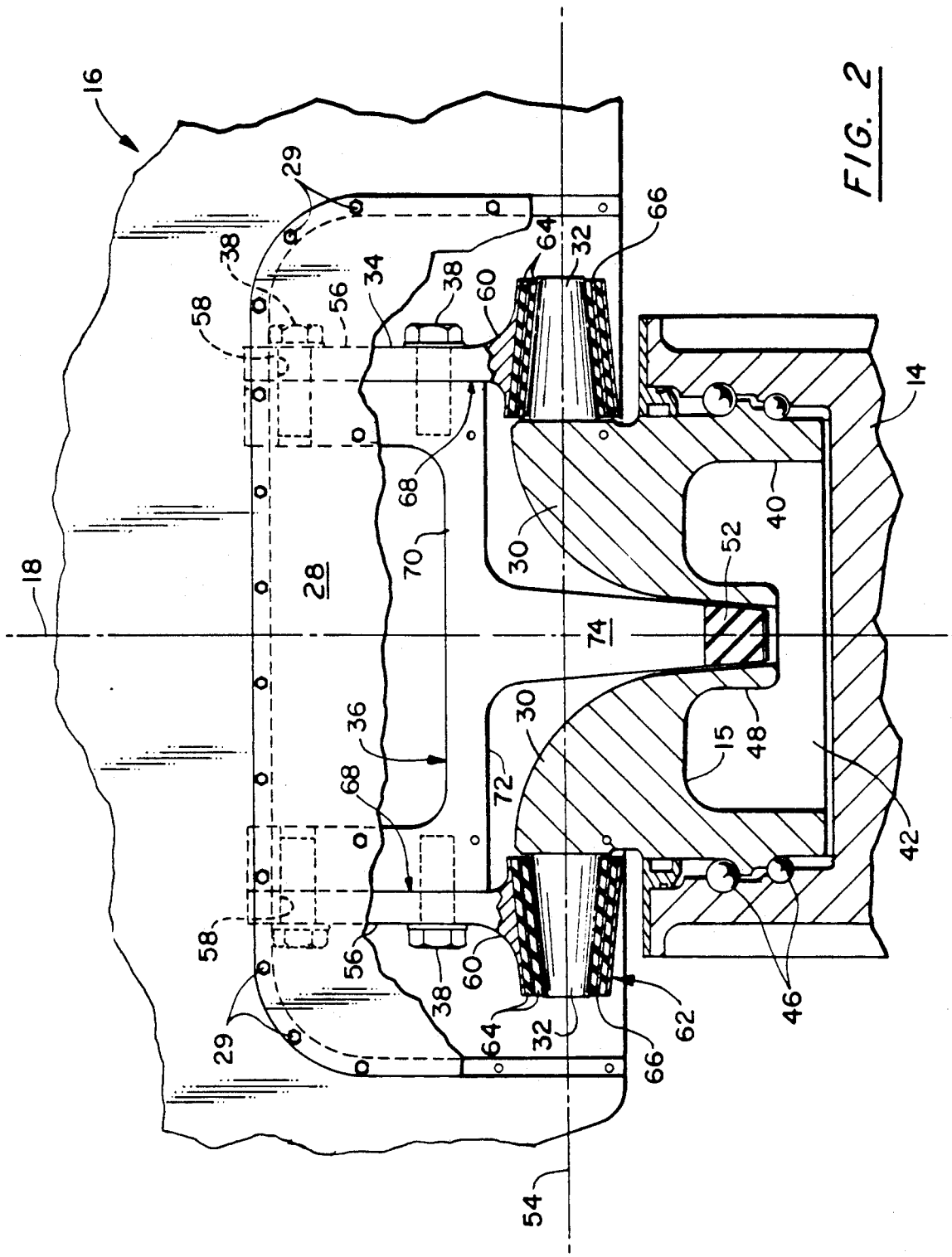
FIG. 2 is an expanded view of the propeller assembly of a portion of a propeller assembly of FIG. 1.

Referring to FIG. 2, an expanded view of the mounting system 16 of FIG. 1 is shown. The mounting system is comprised of: a pair of prongs 30 extending from the pitch retention member 14, each prong having a conical pin-like bearing surface 32 extending therefrom, a pair of couplings 34, a mount 36 attaching to the spar, and a plurality of shear bolts 38.

Figure 3:
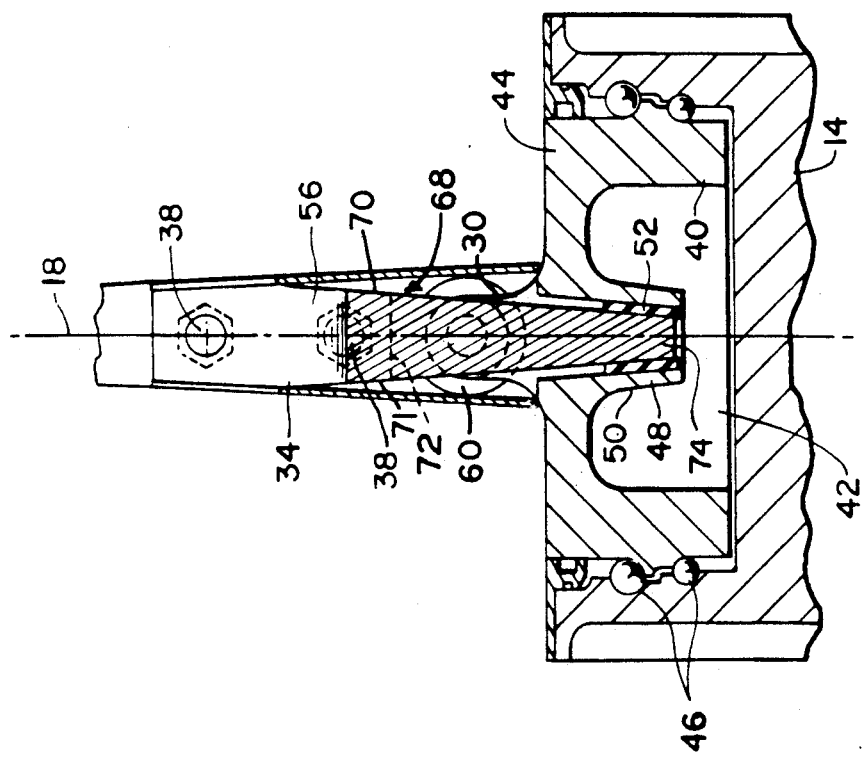
FIG. 3 is a side view of the assembly of FIG. 1.

Referring to FIGS. 2 and 3, the pitch retention member 15 is shown. The pitch retention member has a cylindrical body portion 40 having an open end 42 and a relatively closed end 44. A pair of races 46 extend about the outer periphery of the member for mounting the pitch retention bearing within the hub 14, as is well known in the art. A roughly rectangular nipple 48 extends from the closed end towards the open end. Side walls 50 (see FIG. 3) each have an elastomeric bumper 52 mounted thereto. The walls and the bumpers act as a flap stop as will be discussed infra. Each prong 30 extends along about a 90° arc from the closed end and terminates in the conical pin-like bearing surfaces 32. The bearing surfaces extends at an angle of about 5° to 15° (depending upon the loads encountered) from an axis 54 passing through the bearing surfaces 32.

The couplings 34 each have a flat body portion 56 having a pair of holes 58 passing therethrough, and a conical support 60 depending therefrom. An elastomeric bearing 62 is mounted within the interior of the support by conventional means. Depending on the required bending loads, forces, and motion either two layers of elastomer 64 and one shim 66, or three layers of elastomer and two shims (not shown), is preferred. Typical materials for an elastomeric bearings include rubber compounds, such as 85% natural rubber and 15% polybutadiene, for the elastomer and stainless steel for the shims. The compressive modulus for the elastomeric material may be on the order of hundreds of thousands of pounds per square inch. Tension, on the other hand, is reacted by the tensile strength of the elastomer which is comparatively low. The reaction of tensile forces on the elastomeric material can be reduced to acceptable levels, as is known in the elastomeric bearing art, by bearing precompression.

The mount 36 forms a sleeve for receiving the root of the spar. The mount has a pair of side walls 68 (each of which attaches to a coupling 34), a u-shaped front wall 70, a u-shaped rear wall (not shown) and a bottom wall 72. Each side wall 68 has a pair of openings (not shown) for receiving the shear bolts, as will be discussed infra. The spar is bonded conventionally between the side walls 68, between the front wall 70 and back wall and to the bottom wall 72. A tang 74 extends from the bottom wall into the nipple 48.

To construct the propeller assembly, the tang 74 extending from the mount is inserted in the nipple 48. The conical support 60 of each coupling 34 is disposed about a respective bearing surface 32. The shear bolts 38 are inserted into the holes and openings and then tightened to precompress the elastomeric bearing against the bearing surfaces 32. In the instant application, for the stresses and forces encountered, it is desired to precompress the elastomeric material about 10%. It is also known in the art to effect precompression within an elastomeric bearing by injecting the elastomeric material into the bearing under pressure.

In operation, the elastomeric bearings react the normal flapwise loadings about axis 54 of the blade. The conical shape of the elastomeric bearings and bearing surfaces tend to provide axial stiffness along the chord of the blade (i.e. through axis 54). A straight bearing might create shear stresses within the elastomeric bearing along the axis as the blade encounters the free air stream. Any tilt of the blade along the axis is reacted by the elastomeric bearing along the conical surfaces of the coupling and the bearing surface in compression. The side walls 50 act as a flap stop for the blade should the blade experience abnormal stresses (as may be caused by foreign object collisions or other forces) that may cause the blade to flap beyond the normal range. The elastomeric bumpers 52 help to lessen the spiking effect of blade harmonic frequency changes and attachment loads.

Figure 4:
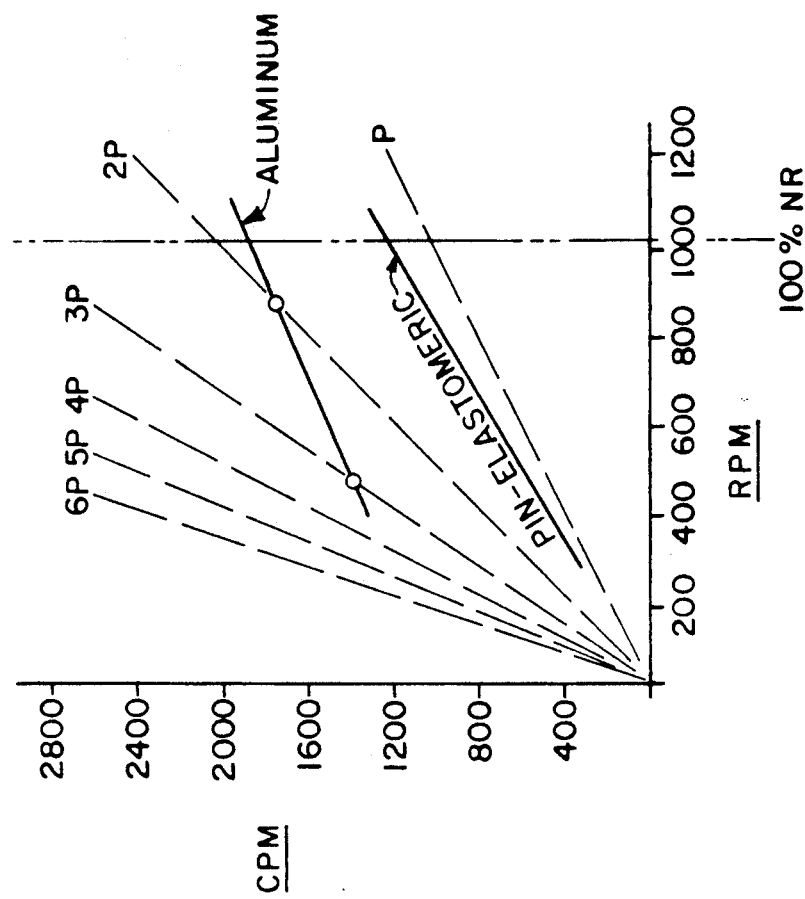
FIG. 4 is a graphical representation of advantages of the invention of FIG. 1.

Referring to FIG. 4, the advantages of the present system can be seen. CPM on the y-axis defines cycles per minute. RPM on the x-axis defines blade revolutions per minute. P represents the first flapwise frequency while 2P through 6P define the higher harmonic frequencies which may be encountered in a propeller blade having a 58° twist at 75% of the blade length. It can be seen in the instant example that a typical aluminum blade stimulates the 2P and 3P natural frequencies at approximately 400 and 800 RPM respectively. Stimulation of the natural frequencies of the blades may be detrimental in that the dynamic loading of the system is amplified thereby testing system tolerances. However, it can be seen along the pin-elastomeric line that the lower natural frequencies of the mounting system of the instant invention do not stimulate the natural frequencies of the blade for the entire RPM envelope. Further, by uncoupling the blade from the pitch retention member by means of the pin disposed radially outwardly from the pitch retention member about which the blade may flap, the blade experiences lower natural frequencies which improves the high speed stability of the blade.

Other advantages also accrue by mounting the propeller to the pitch change mechanism by means of a elastomeric bearing: since elastomeric bearings accommodate motion by simple flexing of elastomeric laminates, there is no rolling or slipping between elements as in more conventional bearings; no lubrication or servicing of any kind is required; seal boots or dust covers are not needed; friction or wear is minimized; and, visional inspection is sufficient to determine bearing condition. The conical portions insure that the joint is stiff in a chordwise direction relative to the propeller blade. Damaged blades are quickly and easily replaced by removing the access panel and unbolting the couplings. The bearing allows the blade to flap thereby increasing the tolerance of the blade to foreign object damage.

Although this invention has been shown and described with respect to detailed embodiments thereof, it will be understood by those skilled in the art that various changes in form and detail thereof may be made without departing from the spirit and scope of the claimed invention.

We claim:

1. Apparatus for mounting a propeller blade having a load bearing member to a hub, said apparatus comprising:
   a. a pitch retention member rotatably mounted to said hub so as to extend axially outwardly therefrom, said retention member having a cylindrical body portion having a first relatively closed end mounted to said hub, a second open end extending outwardly from said hub, and a receiving nipple extending centrally from the relatively closed end axially outwardly toward and opening to the open end, and having a pair of conical bearing surfaces extending therefrom in opposite directions along an axis outboard of said hub and parallel to a chord of said blade;
   b. coupling means for mounting to the load bearing member of said blade, said coupling means having a support member mounted to the load bearing member of said blade, a pair of coupling members, each having a body portion adapted to be mounted the support member and a depending portion extending from the body portion, the depending portion having conical housing means formed therein for receiving the conical bearing surfaces extending from said pitch retention member, and mounting means operatively associated with said coupling members for mounting said coupling members to said support member;
   c. annular conical elastomeric bearing means disposed within said housing means between the housing means and the bearing surface received therein, said elastomeric bearing means reacting dynamic forces of said blade as said blade rotates about the bearing surface and reacting motion of said blade parallel to said axis or in tilt relative to said axis in compression; and d. an elongated rigid member mounted to the load bearing member of said blade and extending radially inwardly therefrom through the open end of said pitch retention member to be loosely received within the receiving nipple of said pitch retention member.

2. Apparatus as recited in claim 1 wherein the conical bearing surfaces extend outwardly at a downward angle of about 5 to about 15 degrees with respect to said axis.

3. Apparatus as recited in claim 1 wherein the mounting means operatively associated with said coupling members for mounting said coupling members to said support member further comprise precomposition means for applying a precompression force to each of the conical elastomeric bearings disposed between the bearing surfaces of said pitch retention members and the conical housing means of said coupling means.

4. Apparatus as recited in claim 1 further comprising elastomeric bumper means mounted to the radially inward end of said elongated rigid member.

* * * * *